(12) United States Patent
Chu

(10) Patent No.: US 6,314,001 B1
(45) Date of Patent: Nov. 6, 2001

(54) DESKTOP COMPUTER WITH EXTERNAL POWER SUPPLY MODULE

(75) Inventor: Ping-Chun Chu, Taipei Hsien (TW)

(73) Assignee: Meridian Technology Corp. (TW)

( * ) Notice: Subject to any disclaimer, the term of this patent is extended or adjusted under 35 U.S.C. 154(b) by 0 days.

(21) Appl. No.: 09/632,728

(22) Filed: Aug. 4, 2000

(30) Foreign Application Priority Data

Jun. 28, 2000 (TW) .............................................. 089211080

(51) Int. Cl.[7] ...................................................... H02B 1/20
(52) U.S. Cl. .......................... 361/826; 361/827; 361/683; 361/753; 174/60; 439/502; 307/38
(58) Field of Search .................................... 361/752, 753, 361/683, 826, 827; 174/59, 60, 33; 439/502; 307/30, 31, 38

(56) References Cited

U.S. PATENT DOCUMENTS

| | | | |
|---|---|---|---|
| 4,382,649 | * | 5/1983 | Meyer ...................................... 339/39 |
| 5,027,257 | * | 6/1991 | Lockwood et al. ................... 361/428 |
| 5,507,668 | * | 4/1996 | Lambrinos et al. .................. 439/502 |
| 5,578,876 | * | 11/1996 | Crampton ................................ 307/80 |
| 5,852,544 | * | 12/1998 | Lee ........................................ 361/683 |
| 5,855,064 | * | 1/1999 | Chang ..................................... 29/861 |
| 6,046,513 | * | 4/2000 | Jouper et al. ........................... 307/31 |

* cited by examiner

Primary Examiner—Jeffrey Gaffin
Assistant Examiner—Tuan Dinh
(74) Attorney, Agent, or Firm—Trop, Pruner & Hu, P.C.

(57) ABSTRACT

A desktop computer includes a main computer module, a power supply module and a connecting unit. The main computer module includes a housing and a plurality of electronic devices mounted in the housing. Each of the electronic devices has a power supply input. The housing is formed with a cable opening. The power supply module is disposed outside the housing of the main computer module, and has a plurality of power supplying outputs. The power supply module is operable so as to provide a plurality of dc operating voltages at the power supply outputs. The connecting unit includes a first cable portion, a second cable portion and a male-and-female electrical connector set. The first cable portion is disposed in the housing, and has a plurality of wires connected respectively to the power supply inputs of the electronic devices. The first cable portion extends outside the housing via the cable opening. The second cable portion has a plurality of wires connected respectively to the power supply outputs of the power supply module. The electrical connector set is provided on the wires of the first and second cable portions so as to interconnect electrically the first and second cable portions.

2 Claims, 2 Drawing Sheets

DESKTOP COMPUTER WITH EXTERNAL POWER SUPPLY MODULE

BACKGROUND OF THE INVENTION

1. Field of the Invention

The invention relates to a desktop computer, more particularly to a desktop computer with an external power supply module.

2. Description of the Related Art

A conventional desktop computer includes an internal power supply module disposed inside a housing of a main computer module for supplying power to a plurality of electronic devices that are mounted in the housing. The greater the number of electronic devices that are in use, the greater will be required power load. Due to the use of capacitors and inductor coils in the power supply module, the size of the power supply module can not be reduced. Accordingly, the size of the main computer module of the conventional desktop computer also cannot be reduced. In addition, when the conventional desktop computer is upgraded, a new power supply module may not fit inside the housing of the main computer module, thereby resulting in inconvenience during assembly.

Furthermore, it is noted that the power supply module in the main computer module generates heat and electromagnetic radiation, thereby resulting in the need to resolve complex heat-dissipating and electromagnetic interference shielding issues.

SUMMARY OF THE INVENTION

Therefore, the object of the present invention is to provide a desktop computer with an external power supply module so as to overcome the drawbacks associated with the aforesaid prior art.

According to the present invention, a desktop computer includes a main computer module, a power supply module and a connecting unit.

The main computer module includes a housing and a plurality of electronic devices mounted in the housing. Each of the electronic devices has a power supply input. The housing is formed with a cable opening.

The power supply module is disposed outside the housing of the main computer module, and has a plurality of power supplying outputs. The power supply module is operable so as to provide a plurality of dc operating voltages at the power supply outputs.

The connecting unit includes a first cable portion, a second cable portion and a male-and-female electrical connector set. The first cable portion is disposed in the housing, and has a plurality of wires connected respectively to the power supply inputs of the electronic devices. The first cable portion extends outside the housing via the cable opening. The second cable portion has a plurality of wires connected respectively to the power supply outputs of the power supply module. The electrical connector set is provided on the wires of the first and second cable portions so as to interconnect electrically the first and second cable portions, thereby respectively providing the dc operating voltages from the power supply module to the electronic devices in the housing of the main computer module via the second cable portion, the electrical connector set and the first cable portion of the connecting unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
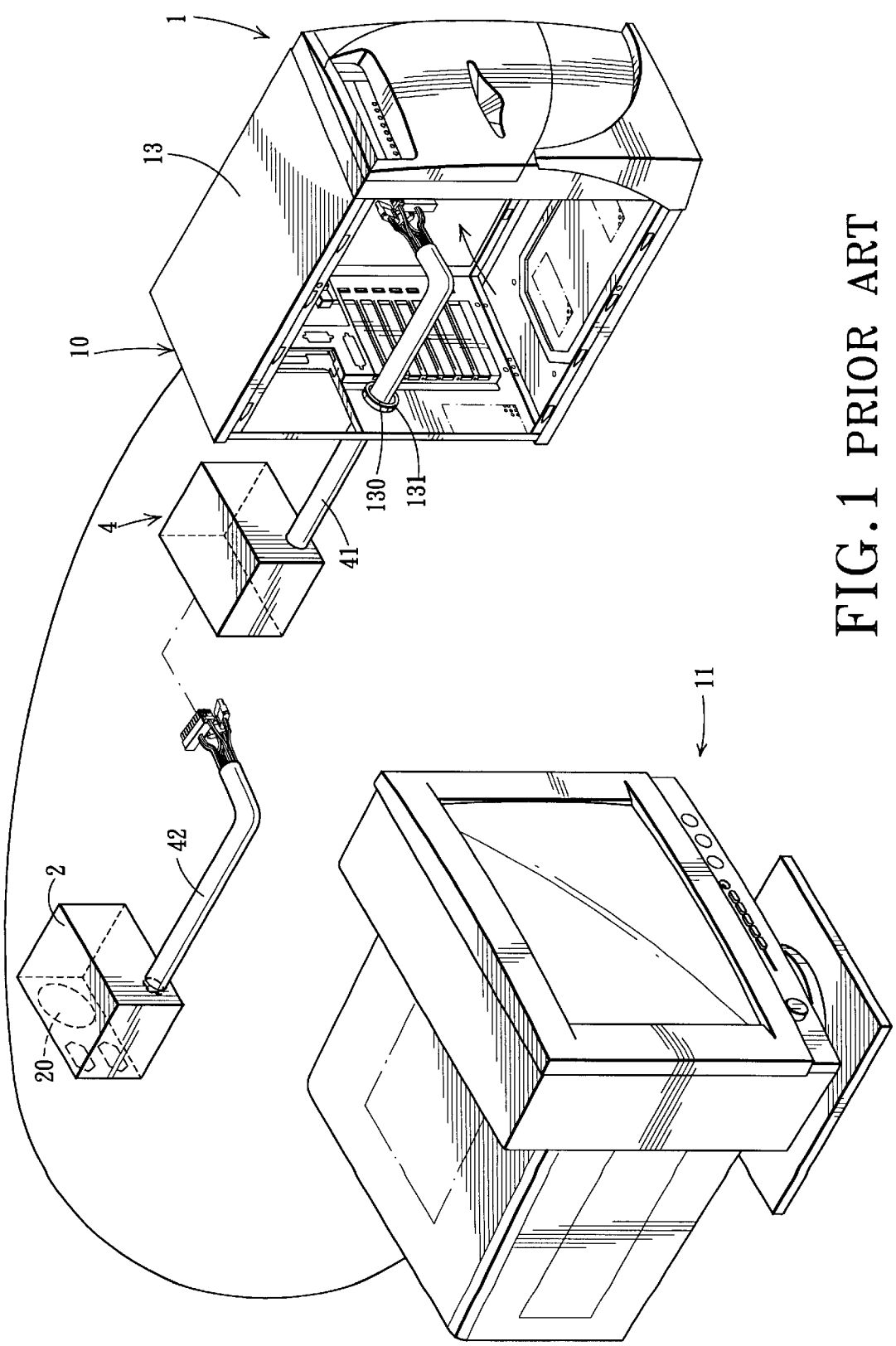
FIG. 1 is a perspective view showing the preferred embodiment of a desktop computer according to this invention.
Figure 2:
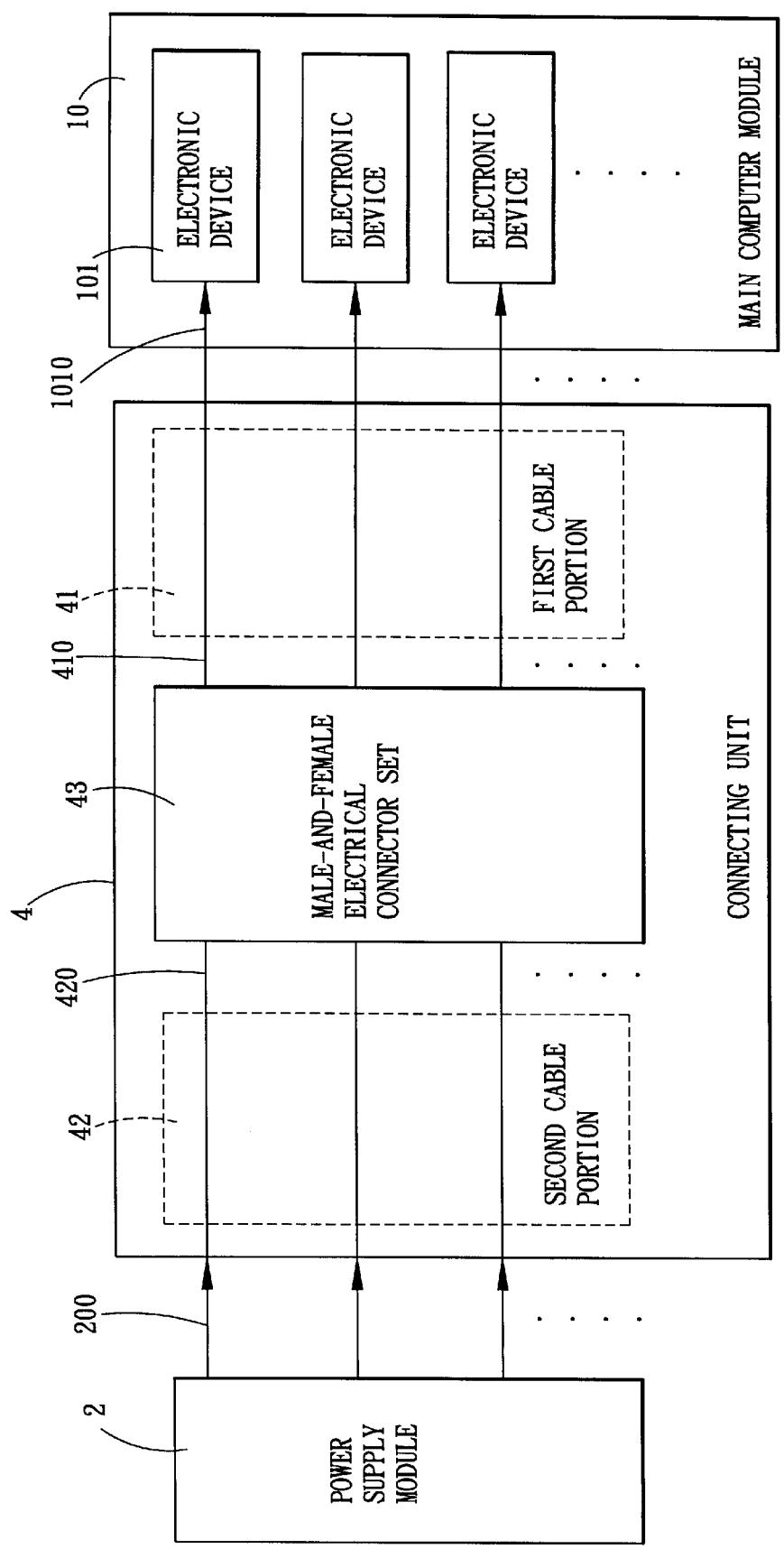
FIG. 2 is a schematic circuit block diagram of the preferred embodiment.

Referring to FIGS. 1 and 2, according to the preferred embodiment of the present invention, a desktop computer 1 is shown to include a main computer module 10, a display module 11 connected electrically to the main computer module 10, a power supply module 2, and a connecting unit 4.

The main computer module 10 includes a housing 13 and a plurality of electronic devices 101, such as a computer motherboard, a floppy disk drive, a hard disk drive, an optical disk drive, . . . , etc. Each of the electronic devices 101 has a power supply input 1010. The housing 13 is formed with a cable opening 130. The housing 13 further has an electromagnetic interference shielding washer 131 mounted in the cable opening 130.

The power supply module 2 is disposed outside the housing 13 of the main computer module 10, and has a plurality of power supply outputs 200. The power supply module 2 is operable so as to provide a plurality of dc operating voltages at the power supply outputs 200. A fan unit 20 is provided on the power supply module 2 for dissipating heat therefrom.

The connecting unit 4 includes a first cable portion 41, a second cable portion 42, and a male-and female electrical connector set 43. The first cable portion 41 is disposed in the housing 13, and has a plurality of wires 410 connected respectively to the power supply inputs 1010 of the electronic devices 101. The first cable portion 41 extends outside the housing 13 via the cable opening 130. The second cable portion 42 has a plurality of wires 420 connected respectively to the power supply outputs 200 of the power supply module 2.

The male-and-female electrical connector set 43 is provided on the wires 410, 420 of the first and second cable portions 41, 42 so as to interconnect electrically the first and second cable portions 41, 42, thereby respectively providing the dc operating voltages from the power supply module 2 to the electronic devices 101 in the housing 13 of the main computer module 10 via the second cable portion 42, the electrical connector set 43 and the first cable portion 41 of the connecting unit 4.

Because the desktop computer 1 of the present invention has the power supply module 2 disposed outside the housing 13 of the main computer module 10, the problem of size incompatibility when upgrading the desktop computer 1 can be avoided. In addition, the size of the main computer module 10 can be reduced, and the heat dissipation and electromagnetic radiation issues attributed to the internal power supply module can be resolved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A desktop computer comprising:
   a main computer module including a housing and a plurality of electronic devices mounted in said housing, each of said electronic devices having a power supply input, said housing being formed with a cable opening;
   a power supply module disposed outside said housing of said main computer module, and having a plurality of power supplying outputs, said power supply module being operable so as to provide a plurality of dc operating voltages at said power supply outputs; and
   a connecting unit including
      a first cable portion disposed in said housing and having a plurality of wires connected respectively to said power supply inputs of said electronic devices, said first cable portion extending outside said housing via said cable opening,
      a second cable portion having a plurality of wires connected respectively to said power supply outputs of said power supply module, and
      a male-and-female electrical connector set provided on said wires of said first and second cable portions so as to interconnect electrically said first and second cable portions, thereby respectively providing the dc operating voltages from said power supply module to said electronic devices in said housing of said main computer module via said second cable portion, said electrical connector set and said first cable portion of said connecting unit.

2. The desktop computer of claim 1, wherein said housing has an electromagnetic interference shielding washer mounted in said cable opening.

* * * * *